(12) United States Patent
Smart (10) Patent No.: US 7,955,206 B2
(45) Date of Patent: Jun. 7, 2011

(54) SELF-ENERGIZING BRAKE FOR A TENSIONER

(75) Inventor: Michael Smart, Locke, NY (US)

(73) Assignee: BorgWarner Inc., Auburn Hills, MI (US)

( * ) Notice: Subject to any disclaimer, the term of this patent is extended or adjusted under 35 U.S.C. 154(b) by 491 days.

(21) Appl. No.: 12/278,424

(22) PCT Filed: Jan. 24, 2007

(86) PCT No.: PCT/US2007/060945
§ 371 (c)(1),
(2), (4) Date: Aug. 6, 2008

(87) PCT Pub. No.: WO2007/092675
PCT Pub. Date: Aug. 16, 2007

(65) Prior Publication Data
US 2009/0069133 A1    Mar. 12, 2009

Related U.S. Application Data (63) Continuation-in-part of application No. PCT/US2007/060941, filed on Jan. 24, 2007, and a continuation-in-part of application No. PCT/US2007/060947, filed on Jan. 24, 2007.

(60) Provisional application No. 60/765,777, filed on Feb. 7, 2006, provisional application No. 60/822,520, filed on Aug. 16, 2006, provisional application No. 60/863,815, filed on Nov. 1, 2006.

(51) Int. Cl.
*F16H 7/08* (2006.01)
(52) U.S. Cl. .................. 474/111; 474/109; 474/140

(58) Field of Classification Search .................. 474/109, 474/110, 111, 115, 117, 122, 140
See application file for complete search history.

(56) References Cited

U.S. PATENT DOCUMENTS

| 2,191,946 A | 2/1940 | Weller |
| 2,261,316 A | 11/1941 | Weller |
| 3,370,476 A | 2/1968 | Hill et al. |

(Continued)

FOREIGN PATENT DOCUMENTS
DE    1724655    6/1956
(Continued)

OTHER PUBLICATIONS

PCT Search Report; PCT/US2007/060945; May 3, 2007; 11 pages.

(Continued)

*Primary Examiner* — Emmanuel M Marcelo
(74) *Attorney, Agent, or Firm* — Brown & Michaels, PC (57) ABSTRACT

A tensioner that includes a blade shoe (106), at least one blade spring (112), a ramp 122), and a brake (132). The blade shoe has a curved chain sliding face, an underside, opposite the chain sliding face, a proximal end pivotally attached to ground and a distal end. The ramp is fixed to ground and has a ramp surface (122a) for contacting the chain sliding face or the underside of the blade shoe. The brake is self-energizing, pivotally fixed to ground and has a friction contact surface (132a) for contacting the distal end portion (106c) of the chain sliding face, the blade spring, or the underside of the blade shoe for restricting movement of the distal end of the blade shoe in one direction and allowing movement in the opposite direction.

10 Claims, 12 Drawing Sheets

U.S. PATENT DOCUMENTS

| | | | |
|---|---|---|---|
| 3,985,379 A | 10/1976 | Normark | |
| 4,325,470 A | 4/1982 | Bopp | |
| 4,653,623 A | 3/1987 | Demorest | |
| 4,921,472 A | 5/1990 | Young | |
| RE34,616 E | 5/1994 | Komorowski et al. | |
| 5,462,493 A | 10/1995 | Simpson | |
| 5,653,652 A | 8/1997 | Simpson | |
| 5,797,818 A | 8/1998 | Young | |
| 5,935,032 A | 8/1999 | Bral | |
| 6,141,831 A | 11/2000 | Novin et al. | |
| 6,264,578 B1 | 7/2001 | Ayukawa | |
| 6,422,962 B1 | 7/2002 | Lehtovaara et al. | |
| 6,428,435 B1 | 8/2002 | Kumakura et al. | |
| 6,439,078 B1 | 8/2002 | Schlude et al. | |
| 6,440,020 B1 | 8/2002 | Tada | |
| 6,447,416 B1 | 9/2002 | Jacques et al. | |
| 6,592,482 B2 | 7/2003 | Serkh | |
| 6,612,953 B2 | 9/2003 | Tada | |
| 6,623,391 B2 * | 9/2003 | Young et al. | 474/111 |
| 6,699,148 B1 | 3/2004 | Taylor et al. | |
| 2002/0045503 A1 | 4/2002 | Young et al. | |
| 2002/0069539 A1 | 6/2002 | Tada | |
| 2002/0162191 A1 | 11/2002 | Chen | |
| 2003/0119616 A1 | 2/2003 | Meckstroth et al. | |
| 2005/0059518 A1 | 3/2005 | Joslyn | |
| 2005/0143207 A1 | 6/2005 | Hashimoto et al. | |
| 2005/0176538 A1 | 8/2005 | Morita | |
| 2006/0234819 A1 * | 10/2006 | Markley et al. | 474/111 |

FOREIGN PATENT DOCUMENTS

| | | |
|---|---|---|
| DE | 1550752 | 10/1969 |
| EP | 1045161 | 10/2000 |
| EP | 1323949 | 7/2003 |
| GB | 155646 | 12/1920 |
| GB | 628803 | 9/1949 |
| GB | 989582 | 4/1965 |
| GB | 1077715 | 8/1967 |
| GB | 2069656 | 8/1981 |
| GB | 2259964 | 3/1993 |
| JP | 1131324 | 5/1989 |
| JP | 6010556 | 1/1994 |
| JP | 6193693 | 7/1994 |
| JP | 6193694 | 7/1994 |
| JP | 8336809 | 12/1996 |
| JP | 2001355688 | 12/2001 |
| JP | 2002098205 | 4/2002 |
| JP | 2005155795 | 6/2005 |
| JP | 2005155796 | 6/2005 |
| JP | 2005155833 | 6/2005 |

OTHER PUBLICATIONS

PCT Search Report; PCT/US2007/060941; May 15, 2007, 10 pages.

PCT Search Report; PCT/US2007060947; Aug. 27, 2008; 16 pages.

* cited by examiner

SELF-ENERGIZING BRAKE FOR A TENSIONER

REFERENCE TO RELATED APPLICATIONS

This application is a continuation in part of copending parent application PCT/US2007/060941, filed Jan. 24, 2007, entitled, "Blade Tensioner With Opposing Spans" and copending parent application PCT/US2007/060947, filed Jan. 24, 2007, entitled, "Torque Biased Friction Hinge For A Tensioner". The aforementioned application(s) are hereby incorporated herein by reference.

This application also claims one or more inventions which were disclosed in Provisional Application No. 60/822,520, filed Aug. 16, 2006, entitled "Self-Energizing Brake for a Tensioner", Provisional Application No. 60/863,815, filed Nov. 1, 2006, entitled "Blade Tensioner with Opposing Spans" and Provisional Application No. 60/765,777, filed Feb. 7, 2006, entitled "Torque Biased Friction Hinge For A Tensioner". The benefit under 35 USC §119(e) of the United States provisional application is hereby claimed, and the aforementioned applications are hereby incorporated herein by reference.

BACKGROUND OF THE INVENTION

1. Field of the Invention

The invention pertains to the field of tensioners. More particularly, the invention pertains to a self-energizing brake for a tensioner.

2. Description of Related Art

Chain drive applications require a tensioning device to maintain tension to control the motion of the chain. Blade spring tensioners are often used to tension a chain drive, and conventional blade spring tensioners apply similar damping forces in both directions of travel. Increased damping is desired when the chain tensioner is being compressed by the chain drive, and then when the tensioner is extending to take up slack in the system.

U.S. Pat. No. 5,935,032 discloses a wheeled tensioner for belts. As the tension from the belt presses on the wheeled tensioning pulley, a first pivot arm having an end with an arcuate surface, compresses a spring that moves a second pivot arm having an end with a movable shoe, and creates friction between the shoe convex arcuate friction surface and the arcuate surface of the first pivot arm.

U.S. Pat. No. 6,699,148 discloses a self adjusting contact mechanism for a belt that includes a contact shoe with a low friction surface with a belt, and a mechanism for biasing the low friction surface of the shoe against the belt with a controlled force profile. The shoe is mounted to a lever arm through a first pivot joint. The first pivot joint maintains the shoe in alignment with and in parallel with the belt. The second pivot connects a lever onto a belt drive system.

Japanese Publication No. 06193693 discloses a blade tensioner in which at the proximal end is a rocker fulcrum and a wedge type interspace formed in an interval between a cam surface and a cylindrical bore. A friction member and a spring member are built in each wedge type interspace. When the tension in the chain increases the friction member is thrust into a narrow part of the interspace and any rocking motion of the chain guide is prevented.

Japanese Publication No. 2001-355688 discloses a first embodiment in which a friction material is inset into the distal end of the blade shoe and contacts the sliding surface of the bracket, increasing dampening. In another embodiment, a friction surface is inset into the sliding surface of the bracket. In an alternative embodiment, the friction surface is inset into the curled ends between the end of the blade shoe and the blade spring.

Japanese Publication No. 08-336809 discloses an energized brake that stops rotation of a chainsaw blade when the motor is turned off. The brake device includes a brake band surrounding a brake drum with an end of the brake band operable by a hand guard, so that when activated, the brake drum is clamped by the brake band, stopping the chain. At the same time, a wire energizes a coil spring contacting a brake shoe, so that when a switch is turned off, the wire energizes the coil spring and thus the brake shoe, causing the shoe to engage the brake drum. When the switch is turned on, the brake shoe resists the coil spring and the shoe does not engage to brake drum.

Therefore, there is a need in the art for a self-energizing brake that increases damping of the blade tensioner during compression of the blade shoe rather than during extension of the blade shoe.

SUMMARY OF THE INVENTION

A tensioner that includes a blade shoe, at least one blade spring, a ramp, and a brake. The blade shoe has a curved chain sliding face, an underside, opposite the chain sliding face, a proximal end pivotally attached to ground and a distal end. The ramp is fixed to ground and has a ramp surface for contacting the chain sliding face or the underside of the blade shoe. The brake is self-energizing, pivotally fixed to ground and has a friction contact surface for contacting the distal end portion of the chain sliding face, the blade spring, or the underside of the blade shoe for restricting movement of the distal end of the blade shoe in one direction and allowing movement in the opposite direction.

When the chain strand radius in contact with blade shoe increases, the blade shoe compresses and the distal end translates further away from the proximal end and the chain strand, sliding further between the ramp and the self-energizing brake. The friction contact surface of the brake contacts the distal portion of the chain sliding face, the underside surface of the blade shoe, and the at least one blade spring, and restricts movement of the distal end of the blade shoe away from the chain and allows movement in an opposite direction.

The friction contact surface may additionally have a friction material bonded to its surface.

In another embodiment, the friction contact surface may have teeth that mate with teeth on the distal end portion of the chain sliding surface.

Alternatively, the underside of the blade shoe and the ramp surface may have teeth that mate.

DETAILED DESCRIPTION OF THE INVENTION

Figure 1A:
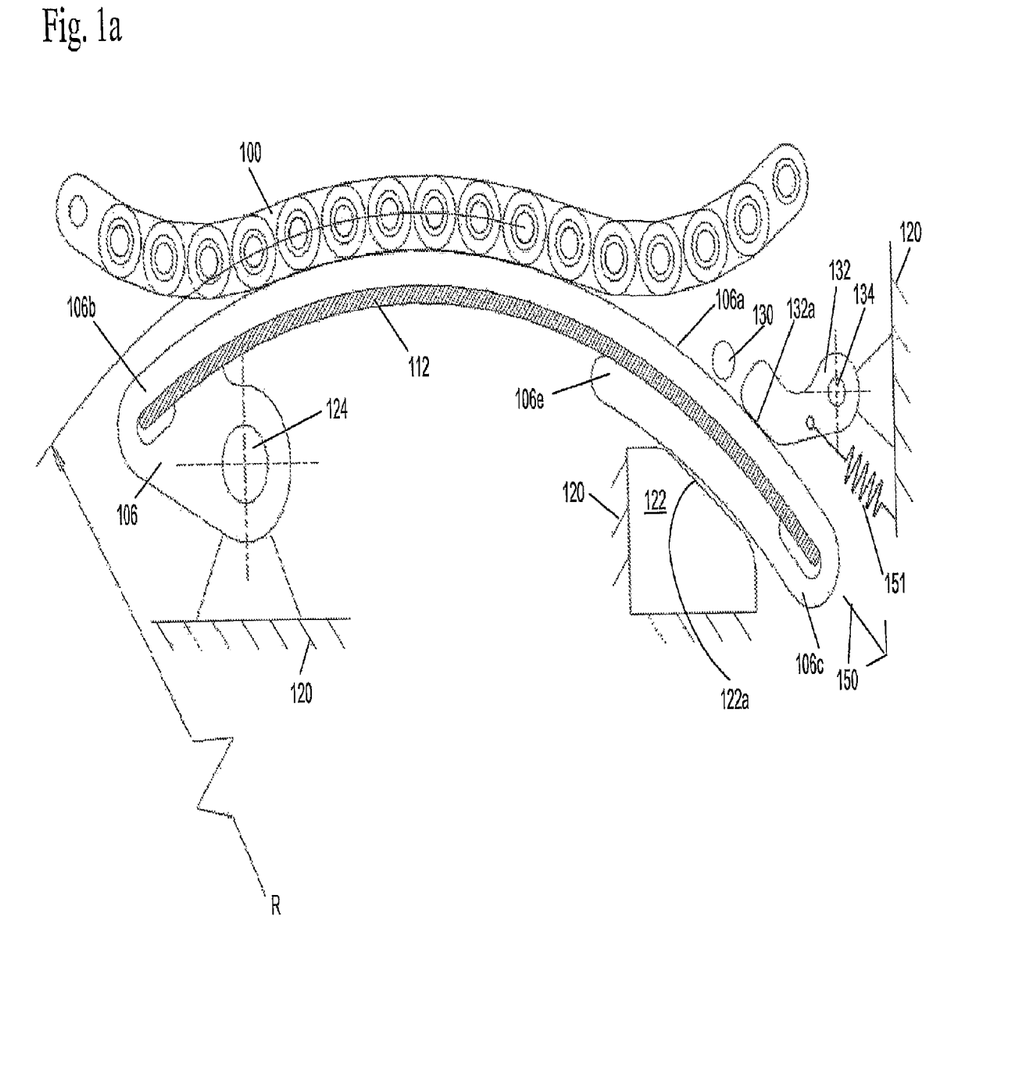
FIG. 1a shows a schematic of a single blade tensioner with the self-energizing brake of a first embodiment of the present invention with the radius of the chain strand in contact with the tensioner increasing or flattening.
Figure 1B:
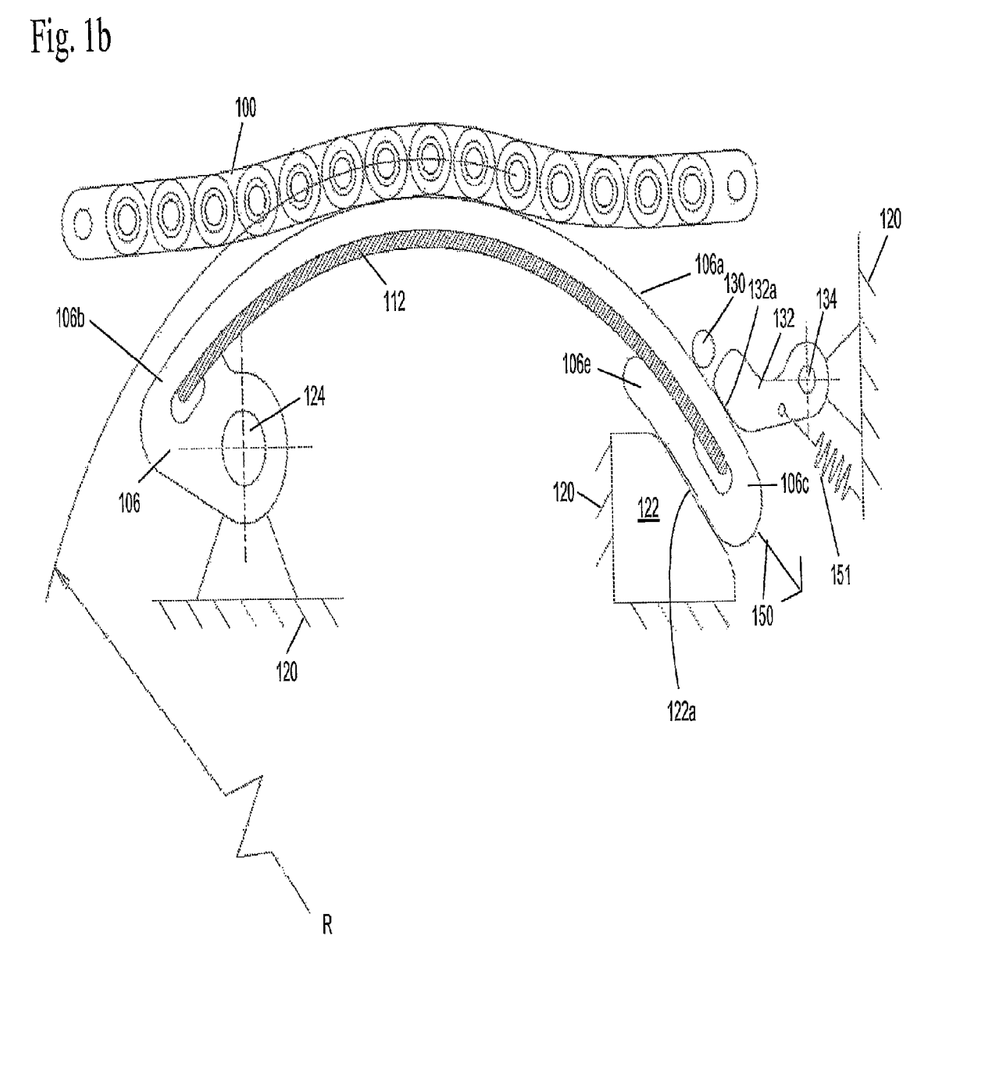
FIG. 1b shows a schematic of a single blade tensioner with the self-energizing brake of a first embodiment of the present invention with the radius of the chain strand in contact with the tensioner decreasing or shortening.

FIGS. 1a and 1b show schematics of a blade tensioner with chain 100. The chain 100 is wrapped around a drive sprocket and a driven sprocket (not shown) with chain strands having radii R between the sprockets. The tensioner includes a blade shoe 106 made out of the polymer material having a proximal end 106b, a distal end 106c, an arcuately curved chain sliding face 106a, and an underside surface 106e opposite the chain sliding face 106a. The blade shoe 106 receives a blade spring 112, which runs along the length of the blade shoe (i.e. from the distal end to the proximal end). The blade spring 112 may consist of a single blade spring or multiple blade springs.

Figure 3A:
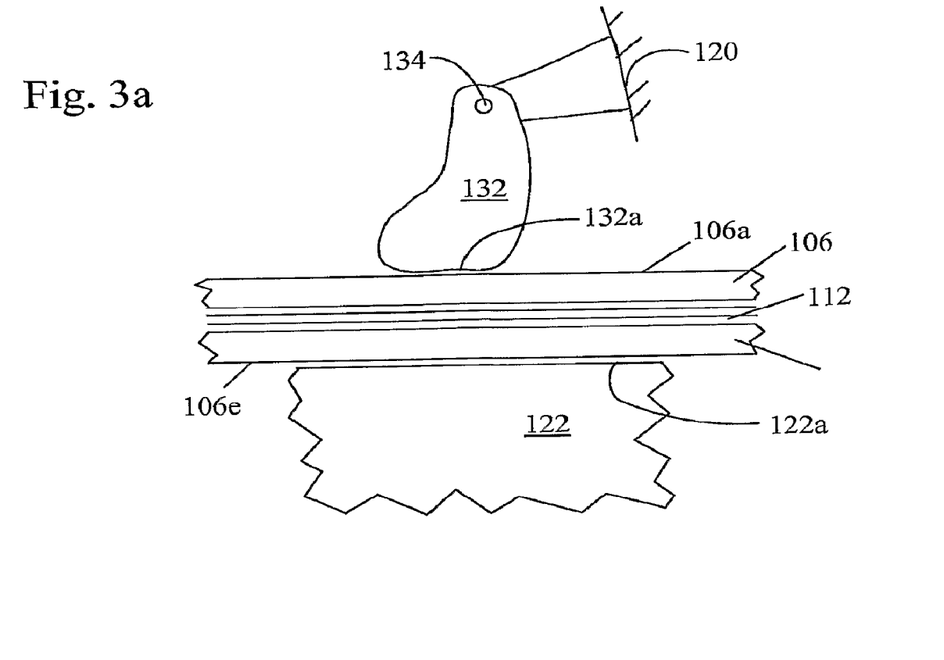
FIG. 3a shows a schematic of the contact between the self-energizing brake and the blade shoe.

The proximal end 106b of the blade shoe 106 is pivotally connected to ground 120 by pin 124. As used herein, the term "ground" is defined as the object or set of objects that the tensioning device is mounted to and is nonmoving relative to the shaft center line of the chain drive. Ground 120 may be the engine block, a bracket, a transmission case, or a frame of the engine. The coupling of different parts of the tensioner to ground may be done by any way in which the two pieces may be fastened. The distal end 106c of the blade shoe 106 is received between a ramp 122 fixed to ground 120 with a ramp sliding face 122a and a self-energizing brake 132 with a brake contacting surface or a friction contacting surface 132a. The self-energizing brake 132 is pivotally connected to ground 120 by pin 134 and is biased towards contacting the chain sliding face 106a of the blade shoe by a biasing element 151, which may be a spring, between ground 120 and the self-energizing brake 132. The brake contacting surface 132a contacts the chain sliding face 106a of the blade shoe. The underside surface 106e of the blade shoe 106 contacts the ramp sliding face 122a of the ramp 122 as also shown in FIG. 3a. A stop 130 on the chain sliding face 106a maintains the underside surface 106e of the blade shoe 106 in contact with the ramp sliding face 122a, as the blade shoe of 106 moves in the direction shown by arrow 150. Either the stop 130 or the ramp sliding face 122a of the ramp always contacts the blade shoe 106 for the entire life cycle of the device.

When the radius R of the chain strand between the two sprockets contacting the arcuately curved chain sliding face 106a increases or flattens as shown in FIG. 1a, the blade shoe compresses and the distal end 106c of the blade shoe translates further away from the proximal end 106b of the blade shoe, with a greater portion of the distal end 106c of the blade shoe 106 being received between the ramp sliding face 122a of the ramp 122 and the brake contacting surface 132a of the brake 132. The friction between the brake contacting surface 132a and the chain sliding face 106a self energizes the brake 132 as the blade shoe 106 moves in the direction of arrow 150, increasing the dampening of the blade shoe.

When the radius R of the chain strand between the two sprockets contacting the curved chain sliding face 106a decreases or shortens, as shown in FIG. 1b, the distal end 106c of the blade shoe translates towards the chain 100 and the proximal end 106b of the blade shoe, causing the blade shoe to bow out and tension the chain strand. The movement of the distal end 106c of the blade shoe 106 in a direction opposite of arrow 150, or in the direction of arrow 153 shown in FIG. 1e, does not energize the brake 132, decreases dampening, and may cause the brake to pivot on pin 134 slightly against the biasing element 151 as the distal end 106c of the blade shoe moves towards the chain.

Figure 1C:
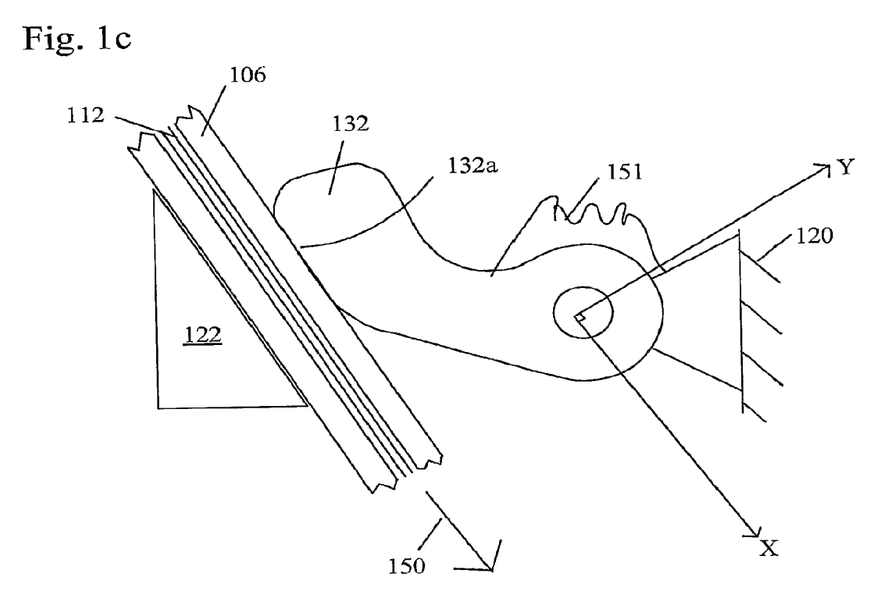
FIG. 1c shows a schematic of a diagram of the self-energizing brake of the present invention when the chain strand radius in contact with the tensioner increases.
Figure 1D:
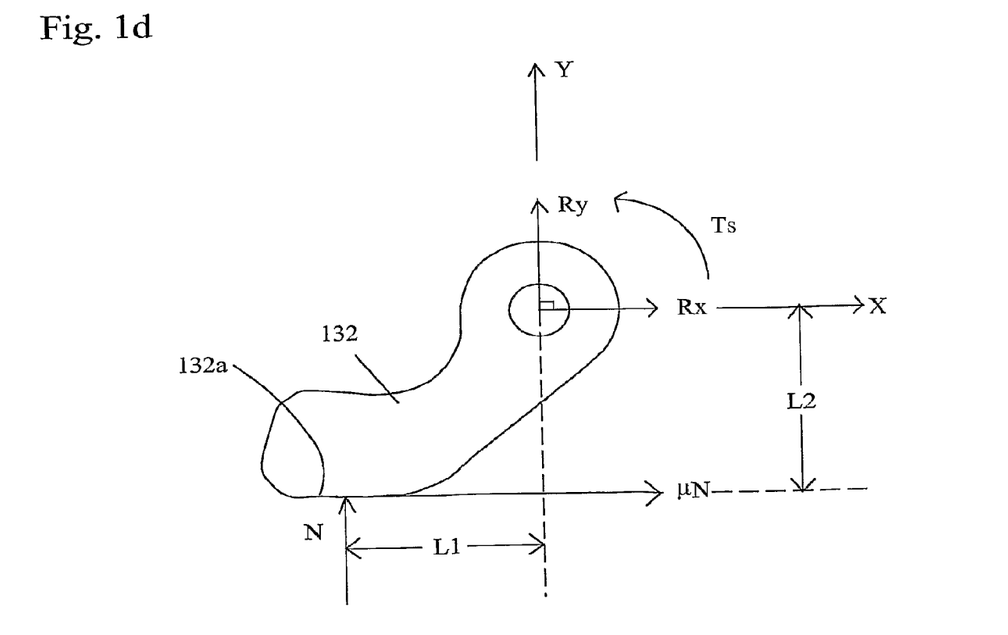
FIG. 1d shows a schematic of a free body diagram of the self-energizing brake of the present invention when the chain strand radius in contact with the tensioner increases.

FIGS. 1c and 1d show diagrams of the self-energizing brake when the radius of the chain strand increases. Referring to FIG. 1d, the variables are:

Rx and Ry are the reaction forces of X and Y respectively;

$L_1$ is the orthogonal distance from the normal force N, to the pivoting pin 134;

$L_2$ is the orthogonal distance from pivoting pin 134 to brake contact surface 132a;

Ts is the moment from biasing element 151 biasing the self-energizing brake into contact with the blade shoe 106; and $\mu$ is the coefficient of friction.

Force Balance on the Self-Energizing Brake in the Self-Energizing Direction

Referring to FIGS. 1c and 1d, the sum of forces in the X and Y direction are:

$$\Sigma \vec{F}x = 0 = Rx + \mu N \quad (1.1)$$

$$\Sigma \vec{F}y = 0 = Ry + N \quad (1.2)$$

The Sum of the Moments about the Pivot or Pin are:

$$\Sigma \vec{M}o = Ts + \mu N L_2 - N L_1 = 0 \quad (1.3)$$

Solving the Moment Balance for N:

$$N = \frac{Ts}{(L_1 - \mu L_2)} \quad (1.4)$$

Equation 1.4 is only valid for $L_1 > \mu L_2$. The friction force is equal to $\mu N$, so friction force is:

$$\frac{\mu Ts}{(L_1 - \mu L_2)} \quad (1.5)$$

As $L_1 - \mu L_2$ approaches zero, the friction force increases and the closer to zero, the greater force bias while still allowing movement of the distal end of the blade shoe. At zero, the distal end of the blade shoe would not be permitted to move at all.

The movement of the distal end 106c of the blade shoe 106 in a direction opposite of arrow 150 or in the direction of arrow 153, does not energize the brake of 132 and may cause the brake to pivot on pin 134 slightly against the biasing element 151 as the blade shoe extends and the distal end 106c moves towards the chain. The self-energizing brake 132 is preferably in alignment or directly positioned across from the ramp sliding face 122a of the ramp 122. Stop 130 prevents the blade shoe 106 from leaving the ramp sliding face 122a as it moves in a direction opposite of arrow 150.

Figure 1E:
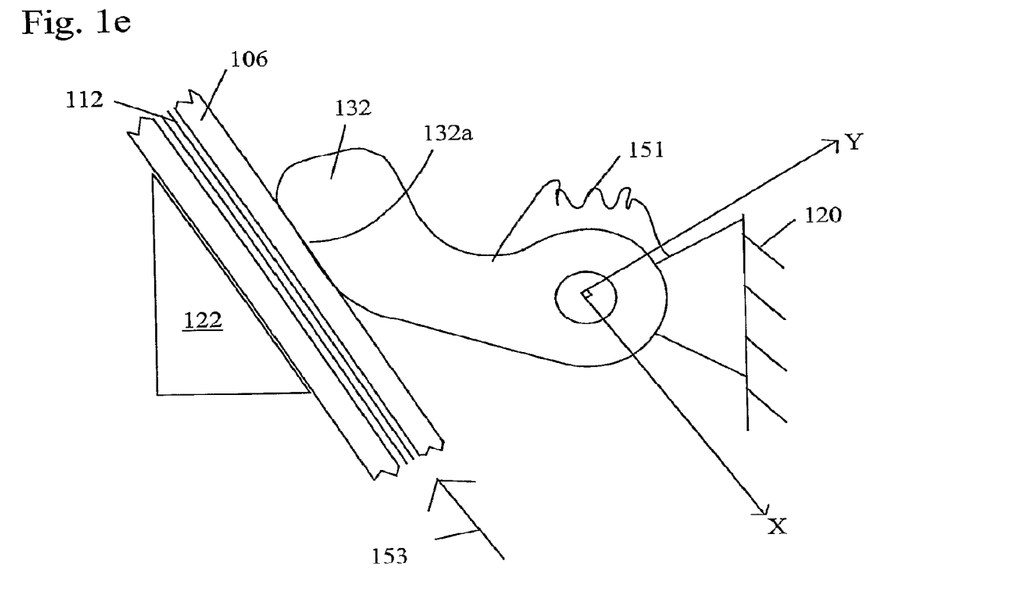
FIG. 1e shows a schematic of a diagram of the self-energizing brake of the present invention when the chain strand radius in contact with the tensioner decreases.
Figure 1F:
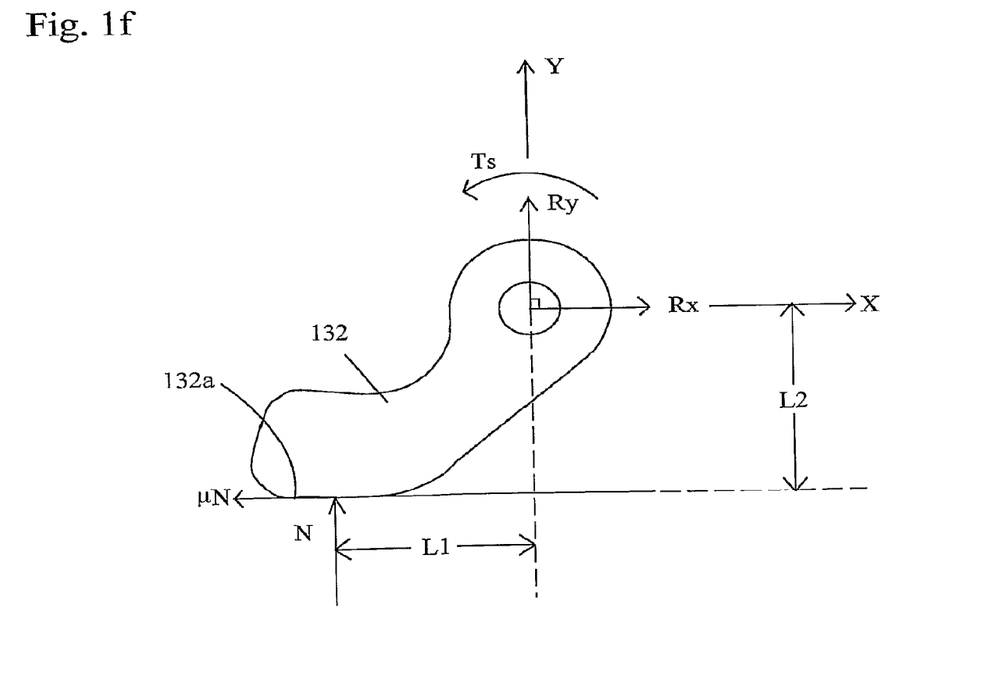
FIG. 1f shows a schematic of a free body diagram of the self-energizing brake of the present invention when the chain strand radius in contact with the tensioner decreases.

FIGS. 1e and 1f show diagrams of the self-energizing brake when the radius of the chain strand decreases and the distal end 106c of the blade shoe 106 moves in the direction of arrow 153, opposite the direction of arrow 150. Referring to FIG. 1f, the variables are:

Rx and Ry are the reaction forces of X and Y respectively;
$L_1$ is the orthogonal distance from the normal force N, to the pivoting pin 134;
$L_2$ is the orthogonal distance from pivoting pin 134 to brake contact surface 132a;
Ts is the moment from biasing element 151 biasing the self-energizing brake into contact with the blade shoe 106; and
μ is the coefficient of friction.

Force Balance on the Self-Energizing Brake in the Non-Self-Energizing Direction

Referring to FIGS. 1e and 1f, the sum of forces in the X and Y direction are:

$$\Sigma \vec{F}x = 0 = Rx - \mu N \quad (2.1)$$

$$\Sigma \vec{F}y = 0 = Ry + N \quad (2.2)$$

The sum of the moments about the pivot or pin is:

$$\Sigma \vec{M}o = 0 = Ts - \mu N L_2 - N L_1 \quad (2.3)$$

Solving the Moment Balance for N:

$$N = \frac{Ts}{(\mu L_2 + L_1)} \quad (2.4)$$

The Friction Force is Equal to μN, so Friction Force is:

$$\frac{\mu Ts}{(\mu L_2 + L_1)} \quad (2.5)$$

Equations 2.4 and 2.5 are always valid for brake traveling in the non-self-energizing direction.

The self-energizing brake creates greater frictional forces in one direction of travel and not the other, for example if

μ=0.8

$L_1$=0.0028 m $L_2$=0.003 m

Ts=0.2 Nm

In the self energizing direction of travel:

$$N = \frac{Ts}{(L_1 - \mu L_2)} \quad (1.4)$$

$$N = \frac{0.2 Nm}{(0.0028m - 0.8(0.003m))}$$

$$N = 500N$$

Friction force = μN

Friction force = (0.8)(500N)

Friction force = 400N

In the Opposite or Non-Self Energizing Direction of Travel:

$$N = \frac{Ts}{(\mu L_2 + L_1)} \quad (2.4)$$

$$N = \frac{0.2 Nm}{(0.8(0.003m) + 0.0028m)}$$

$$N = 38.46N$$

Friction force = μN

Friction force = (0.8)(38.46N)

Friction force = 30.77N

As shown in the above example, the friction force in the self-energizing direction of travel of the brake is significantly larger than in the opposite direction, e.g. 400N>30.77N.

Figure 2A:
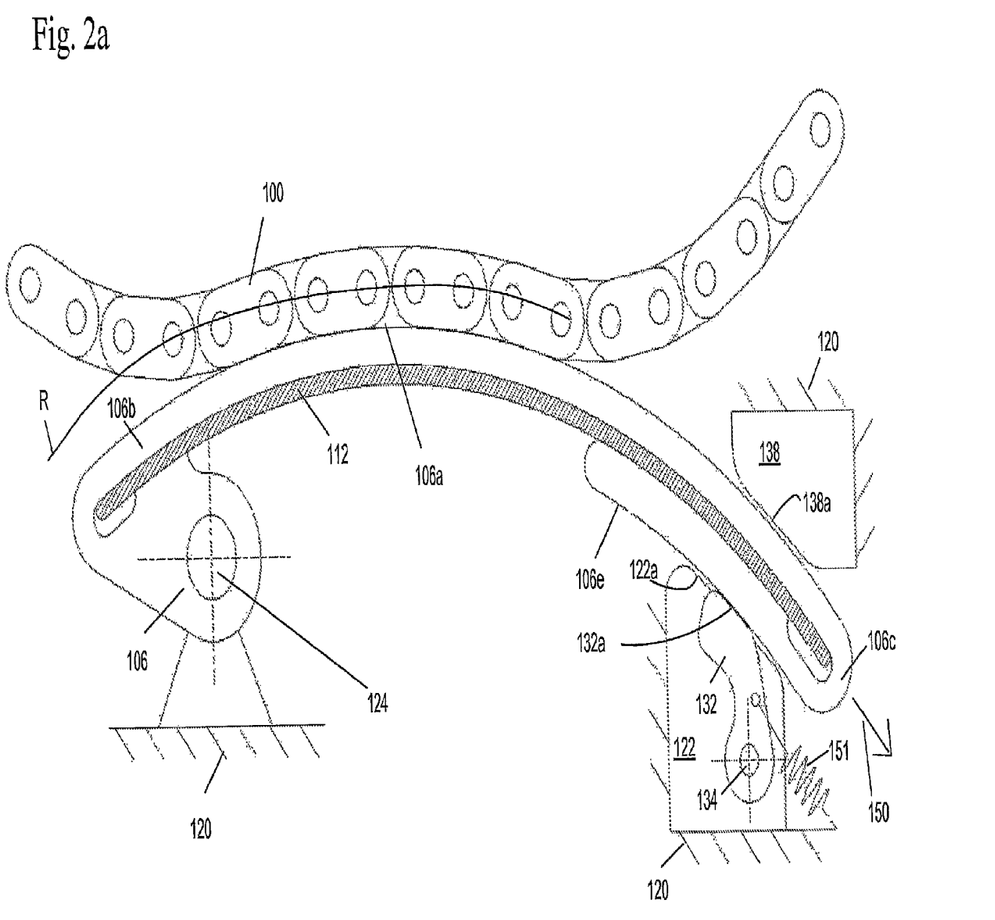
FIG. 2a shows a schematic of a single blade tensioner with the self-energizing brake of a second embodiment of the present invention with the radius of the chain strand in contact with the tensioner increasing or flattening.
Figure 2B:
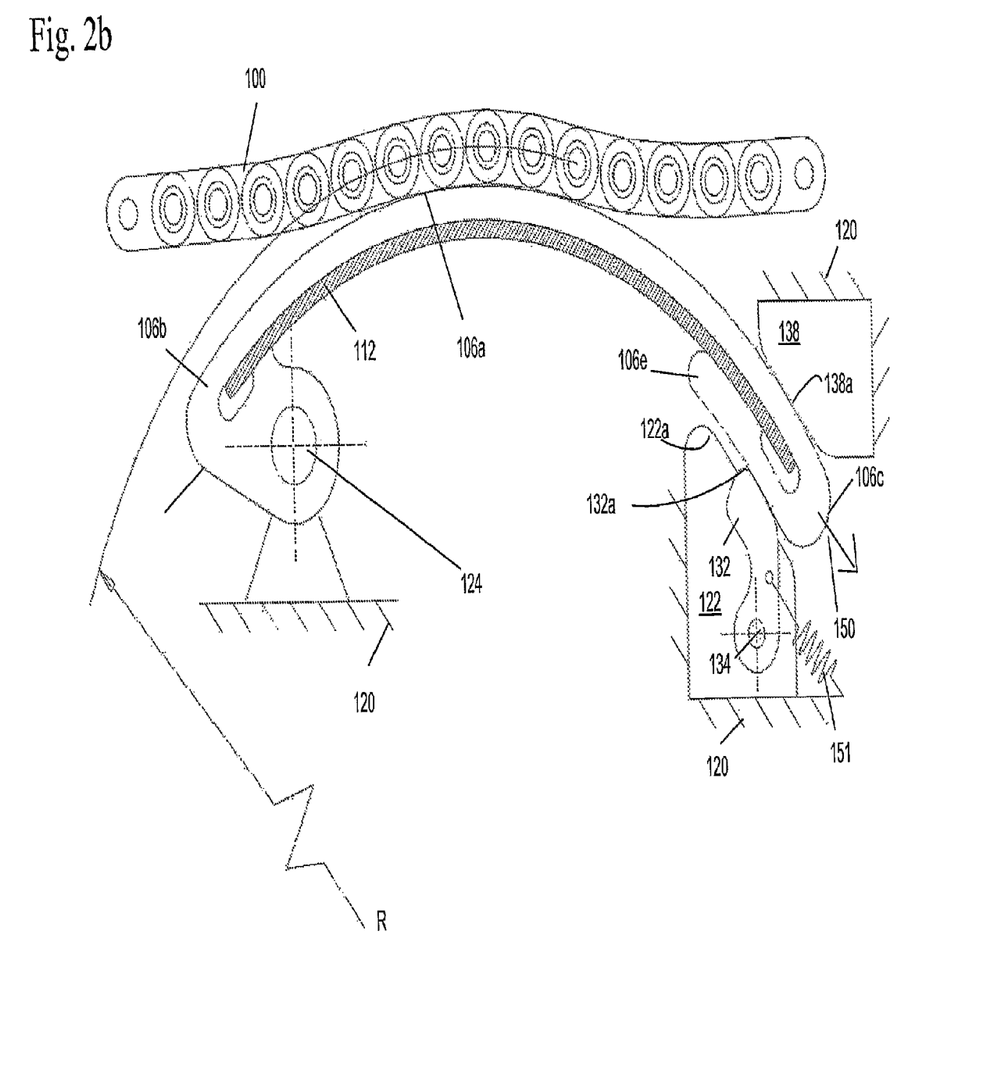
FIG. 2b shows a schematic of a single blade tensioner with the self-energizing brake of a second embodiment of the present invention with the radius of the chain strand in contact with the tensioner decreasing or shortening.

FIGS. 2a and 2b show schematics of an alternative blade tensioner with chain 100. The chain 100 is wrapped around a drive sprocket and a driven sprocket (not shown) with chain strands having radii R between the sprockets. The tensioner includes a blade shoe 106 made out of a polymer material having a proximal end 106b, a distal end 106c, an arcuately curved chain sliding face 106a, and an underside surface 106e, opposite the chain sliding face 106a. The blade shoe 106 receives a blade spring 112, which runs along the length of the blade shoe (i.e. from the distal end to the proximal end). The blade spring 112 may consist of a single blade spring or multiple blade springs.

The proximal end 106b of the blade shoe 106 is pivotally connected to ground 120 by pin 124. Ground 120 may be the engine block, a bracket, a transmission case, or a frame of the engine. The distal end 106c of the blade shoe 106 is received between a second ramp 138 fixed to ground 120 with a second ramp sliding face 138a and a self-energizing brake 132 having a brake contacting surface or a friction contacting surface 132a. The self-energizing brake 132 is pivotally connected to a first ramp 122 by pin 134 and is biased towards the contacting the underside of the chain 106e of the blade shoe by a biasing element 151 attached to ground 120 and the self-energizing brake 132. Ramp 122 is fixed to ground 120. The brake contacting surface 132a contacts the underside 106e of the blade shoe 106. The chain sliding face 106a of the blade shoe 106 contacts the second ramp sliding face 138a as shown in FIG. 3f. Either the second ramp 138 or the self-energizing brake 132 always contacts the blade shoe 106 for the entire life cycle of the device.

When the radius R of the chain strand between the two sprockets contacting the arcuately curved chain sliding face 106a increases or flattens as shown in FIG. 2a, the blade shoe compresses and the distal end 106c of the blade shoe translates further away from the proximal end 106b of the blade shoe, with a greater portion of the distal end 106c of the blade shoe being received between the second ramp sliding face 138 of the second ramp 138 and the brake contacting surface 132a of the brake 132. The friction between the brake contacting surface 132a and the chain sliding face 106a self energizes the brake 132 as the blade shoe 106 moves in the direction of arrow 150, increasing the dampening of the blade shoe.

When the radius R of the chain strand between the two sprockets contacting the curved chain sliding face 106a decreases or shortens, as shown in FIG. 2b, the distal end 106c of the blade shoe translates towards the chain 100 and the proximal end 106b of the blade shoe, causing the blade shoe to bow out and tension the chain strand. The movement of the distal end 106c of the blade shoe 106 in a direction opposite of arrow 150, or in the direction of arrow 153 shown in FIG. 1e, does not energize the brake 132, decreasing dampening, and may cause the brake to pivot on pin 134 slightly against the biasing element 151 as the distal end 106c of the blade shoe moves towards the chain.

The brake contacting surface 132a may contact various surfaces of the tensioner, creating friction, and allowing the blade shoe to move in one direction and restricting movement in the opposite direction when the radius of the chain strand contacted by the chain sliding face increases.

In FIG. 3a, friction is created between the brake contacting surface 132a of the brake 132 and the chain sliding face 106a. Some friction is also generated between the underside of the blade shoe 106e and the ramp sliding face 122a of the ramp 122. The friction between brake contacting surface 132a and the chain sliding face 106a dampens movement of the blade shoe when the radius of the chain strand in contact with the chain sliding face 106a increases.

Figure 3B:
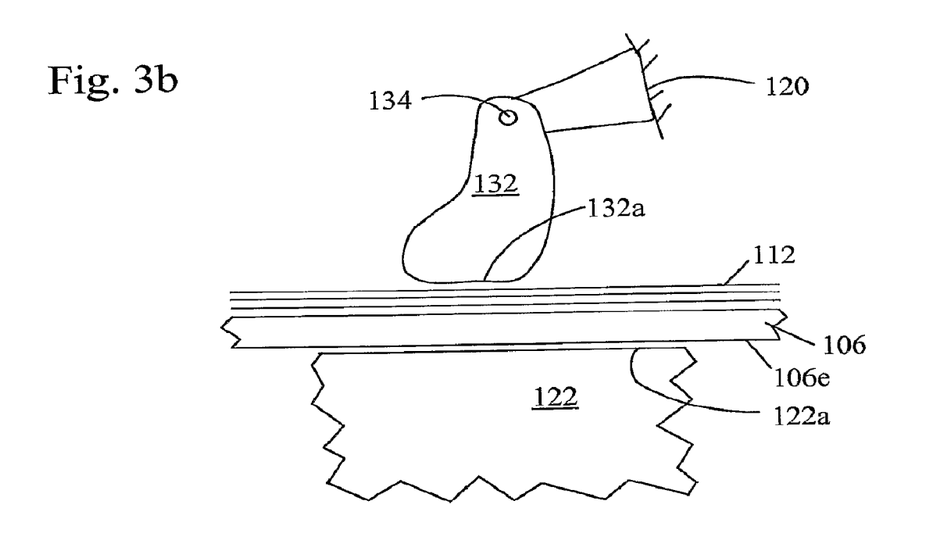
FIG. 3b shows a schematic of the contact between the self-energizing brake and the blade spring of the blade shoe.

Referring to FIG. 3b, friction is created between the brake contacting surface 132a of the brake 132 and the blade springs 112 of the tensioner. Some friction is also generated between the underside of the blade shoe 106e and the ramp sliding face 122a of the ramp 122. The friction between the brake contacting surface 132a and the blade springs 112 dampens movement of the blade shoe when the radius of the chain strand in contact with the chain sliding face 106a increases.

Figure 3C:
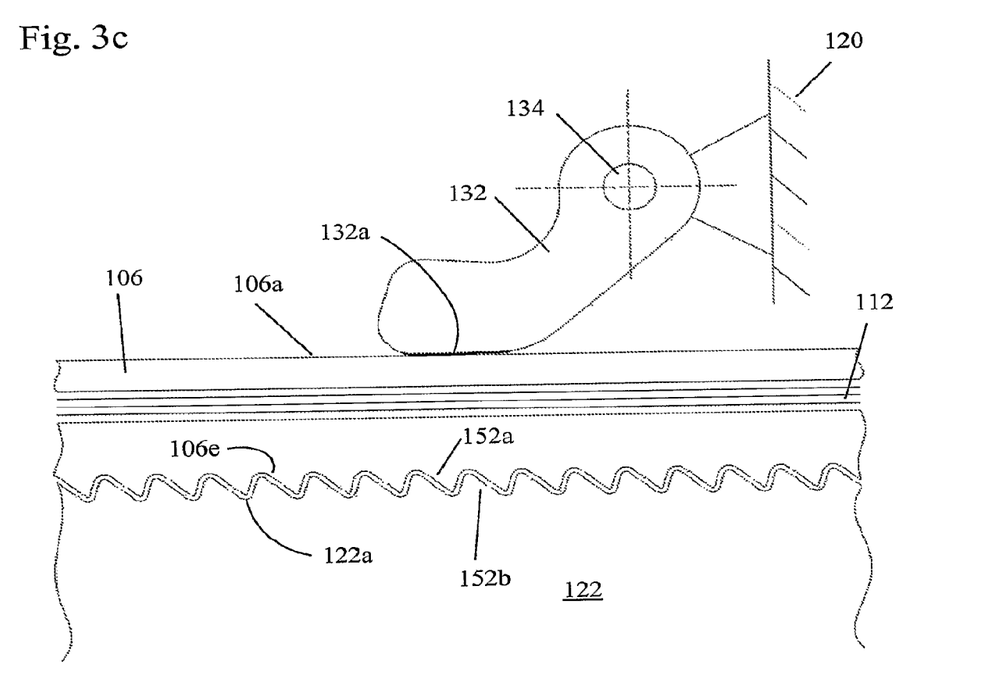
FIG. 3c shows a schematic of the contact between the self-energizing brake and the blade shoe, with placement of ratchet teeth on the underside of the blade shoe and the ramp sliding surface.

In FIG. 3c friction is created between the brake contacting surface 132a of the brake 132 and the chain sliding face 106a. Additional friction is added by teeth 152a on the underside of the blade shoe 106e that mesh and ratchet with teeth 152b on the ramp sliding face 122a of the ramp 122. The teeth may have an angle between 0 and 90 degrees and may also be rounded. The friction dampens the movement of the blade shoe when the radius of the chain strand in contact with the chain sliding face 106a increases.

Figure 3D:
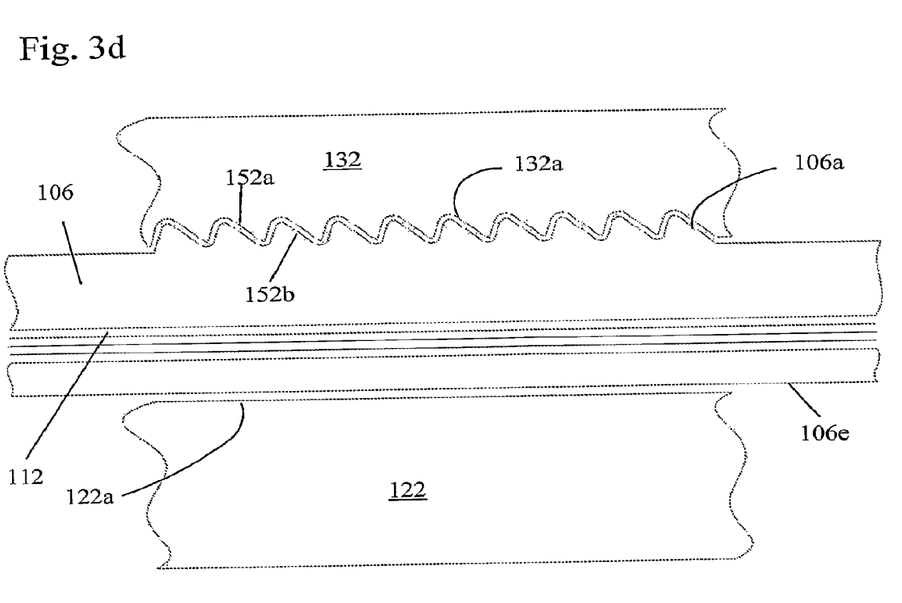
FIG. 3d shows another schematic of the contact between the self-energizing brake and the blade shoe, in which the self-energizing brake and the blade shoe have ratchet teeth.

Referring to FIG. 3d, friction is created between the meshing and ratcheting of the teeth 152a on the brake contacting surface 132a of the brake 132 and the teeth 152b on the distal portion of the chain sliding face 106a. Some friction is also generated between the underside of the blade 106e and the ramp sliding face 122a of the ramp 122. The teeth may have an angle between 0 and 90 degrees and may also be rounded. The friction dampens the movement of the blade shoe when the radius of the chain strand in contact with the chain sliding face 106a increases.

Figure 3E:
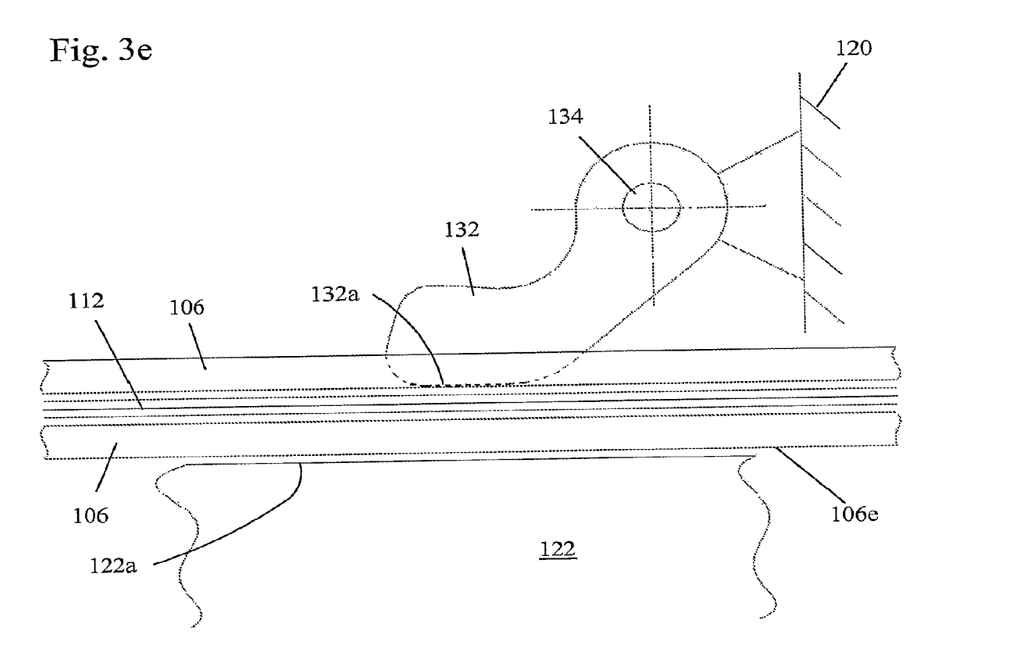
FIG. 3e shows a schematic of contact between the self-energizing brake and the blade springs of the blade shoe.
Figure 3F:
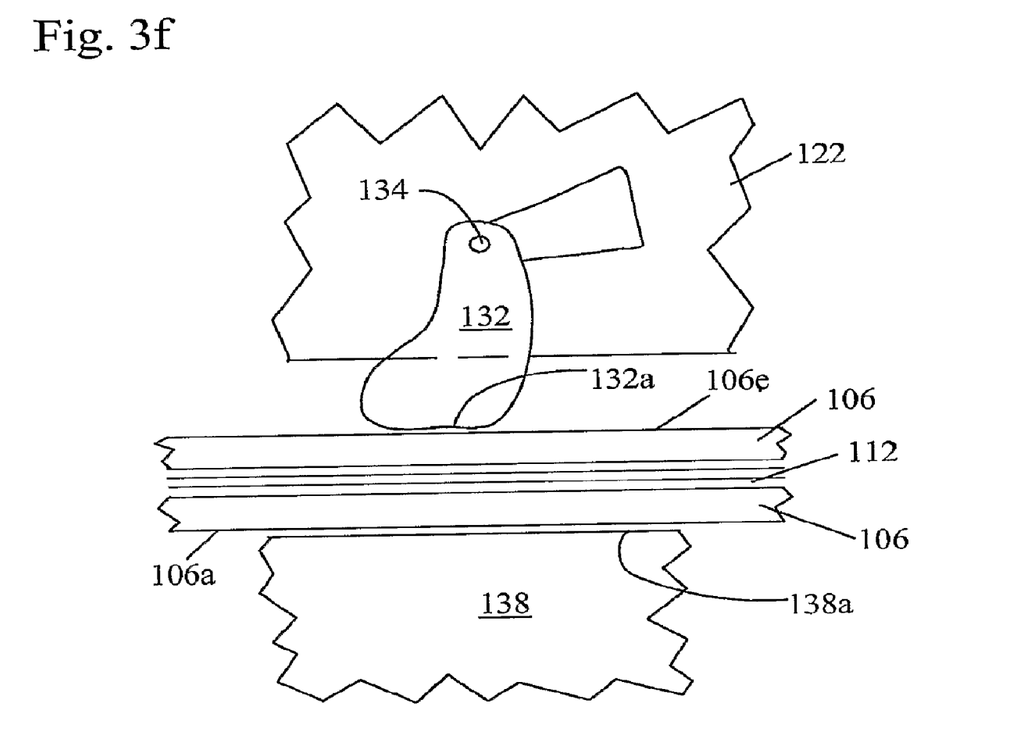
FIG. 3f shows a schematic of contact between self-energizing brake and the underside of the blade shoe.
Figure 4:
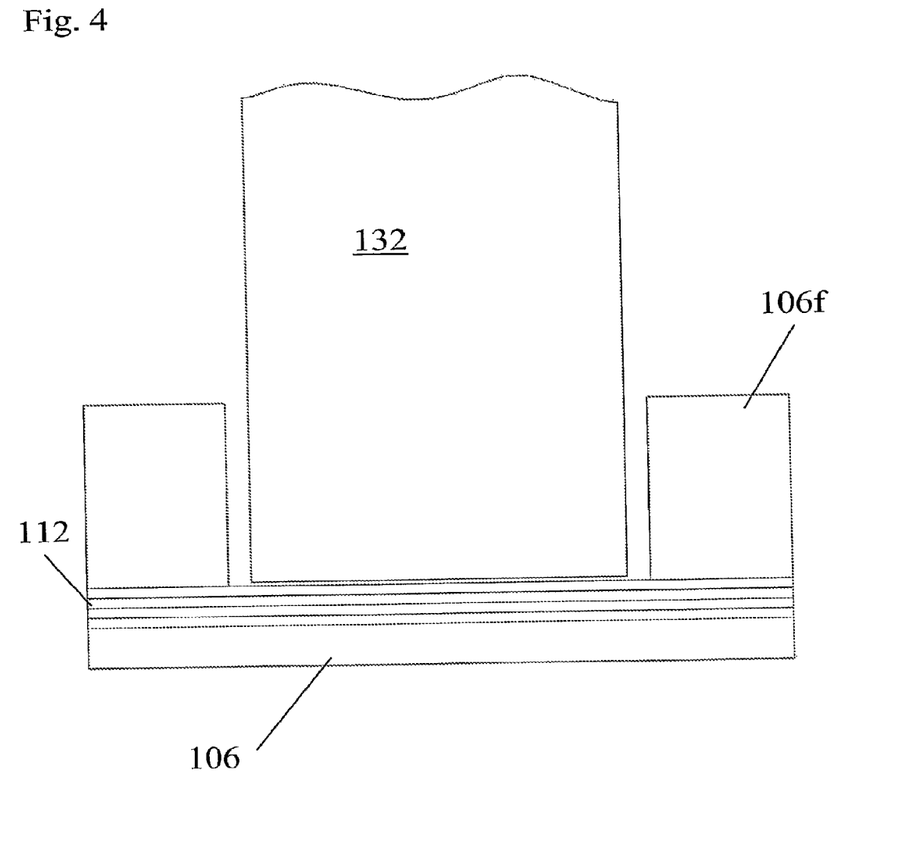
FIG. 4 shows a front view of FIG. 3e.

FIGS. 3e and 4 shows access of the steel blade spring surface 112 to the self-energizing brake 132. This contact between the blade spring 112 and the brake 132 would be used when it is preferable that the ramp 122 occupies the same space as the brake 132 to contact the tensioner arm 106 of the tensioner. The friction generated is similar to the friction generated in FIG. 3b.

FIG. 3f shows the tensioner of the second embodiment. Friction is created between the brake contacting surface 132a of the brake 132 attached to ramp 122 and the underside of the blade shoe 106e. Some friction is also generated between the chain sliding face 106a and the second ramp sliding face 138a of the second ramp 138. The friction between brake contacting surface 132a and the underside of the chain 106e dampens movement of the blade shoe when the radius of the chain strand in contact with the chain sliding face 106a increases.

In any of the above embodiments, the friction is generated between the original surfaces of each of the members. For example, the friction surface on the tensioner arm in FIG. 3a may just be the plastic tensioner arm itself. Preferably, the contact is between the steel or powder metal self-energizing brake and the steel blade springs of the blade tensioner. Alternatively, the friction surface may be paper based and bonded to one of the surfaces in which the contact takes place. Elastomer friction material, other common wet clutch material, or other materials may also be used for the friction material.

Any of the embodiments shown in FIGS. 3a through 4 may be applied to any type of blade tensioner. Furthermore, the brake contact may be on the underside of the blade shoe and not the chain sliding face.

The biasing element 151 may be a spring. The spring may be a compression spring or a torsion spring.

The term "ground" is defined as the object or set of objects that the tensioning device is mounted to and is nonmoving relative to the shaft center line of the chain drive.

The joint between pin 124, housing 120, and the tensioner arm 106 may be replaced by the torque biased friction hinge disclosed in U.S. Provisional Patent Application No. 60/765,777, which was filed on Feb. 7, 2006, entitled, "TORQUE BIASED FRICTION HINGE FOR A TENSIONER" and is herewith incorporated by reference.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for tensioning a chain wrapped around at least two sprockets comprising:
   a blade shoe having a length with an arcuately curved chain sliding face, an underside surface, opposite the arcuately curved chain sliding face, a proximal end pivotally attached to ground, and a distal end;
   at least one blade spring biasing the arcuately curved chain sliding face towards the chain;
   a ramp mounted to ground and having a ramp surface for contacting the arcuately curved chain sliding face or the underside of the blade shoe;
   a self-energizing brake pivotally mounted to ground for restricting movement of the distal end of the blade shoe in one direction and allowing movement in the opposite direction having a brake contacting surface; and
   wherein when a chain strand with a radius between the two sprockets in contact with the blade shoe increases, the blade shoe compresses and the distal end of the blade shoe translates further away from the proximal end of the blade shoe and the chain strand, sliding further between the ramp fixed to ground and the self-energizing brake, such that the brake contacting surface of the brake contacting the distal end portion of the arcuately curved chain sliding face, the underside surface of the blade shoe, or the at least one blade spring, restricts movement of the distal end of the blade shoe away from the chain and allowing movement in an opposite direction.

2. The tensioner of claim 1, further comprising a biasing element for biasing the self-energizing brake into contact with the distal end portion of the arcuately curved chain sliding face of the blade shoe, the underside surface of the blade shoe, or the at least one blade spring.

3. The tensioner of claim 1, wherein the brake contacting surface has teeth with an angle between 0 and 90 degrees.

4. The tensioner of claim 3, wherein a portion of the distal end of the chain sliding face has teeth fixedly attached.

5. The tensioner of claim 1, wherein the ramp surface and the underside of the blade shoe have teeth with an angle between 0 and 90 degrees.

6. The tensioner of claim 1, wherein brake contacting surface is a friction material.

7. The tensioner of claim 6, wherein the friction material is fixedly attached to the at least one blade spring, the underside of the blade shoe, or a distal portion of the arcuately curved chain sliding face.

8. The tensioner of claim 1, further comprising a stop placed adjacent to the brake to maintain contact of the blade shoe with the ramp.

9. The tensioner of claim 1, wherein when the chain strand with the radius between the two sprockets in contact with the blade shoe increases the self-energizing brake has a friction force of $$\frac{\mu T_s}{(L_1 - \mu L_2)} \text{ where } L_1 > \mu L_2,$$

and wherein $\mu$ is a coefficient of friction, Ts is a moment from the spring biasing the brake, $L_1$ is an orthogonal distance from a normal force pivotally attaching the proximal end of the blade shoe to ground and $L_2$ is an orthogonal distance from the pivotally attached proximal end of the blade shoe to the friction contact surface of the brake.

10. The tensioner of claim 1, wherein when the chain strand with the radius between the two sprockets in contact with the blade shoe decreases, the self-energizing brake has a friction force of $$\frac{\mu T_s}{(\mu L_2 + L_1)}$$

wherein $\mu$ is a coefficient of friction, Ts is a moment from the spring biasing the brake, $L_1$ is an orthogonal distance from a normal force pivotally attaching the proximal end of the blade shoe to ground and $L_2$ is an orthogonal distance from the pivotally attached proximal end of the blade shoe to the friction contact surface of the brake.

* * * * *